Nov. 28, 1950         H. E. LA BOUR         2,532,067
AUTOMATIC RETURN FLOW CONTROL VALVE
Filed Sept. 11, 1946                    2 Sheets-Sheet 1
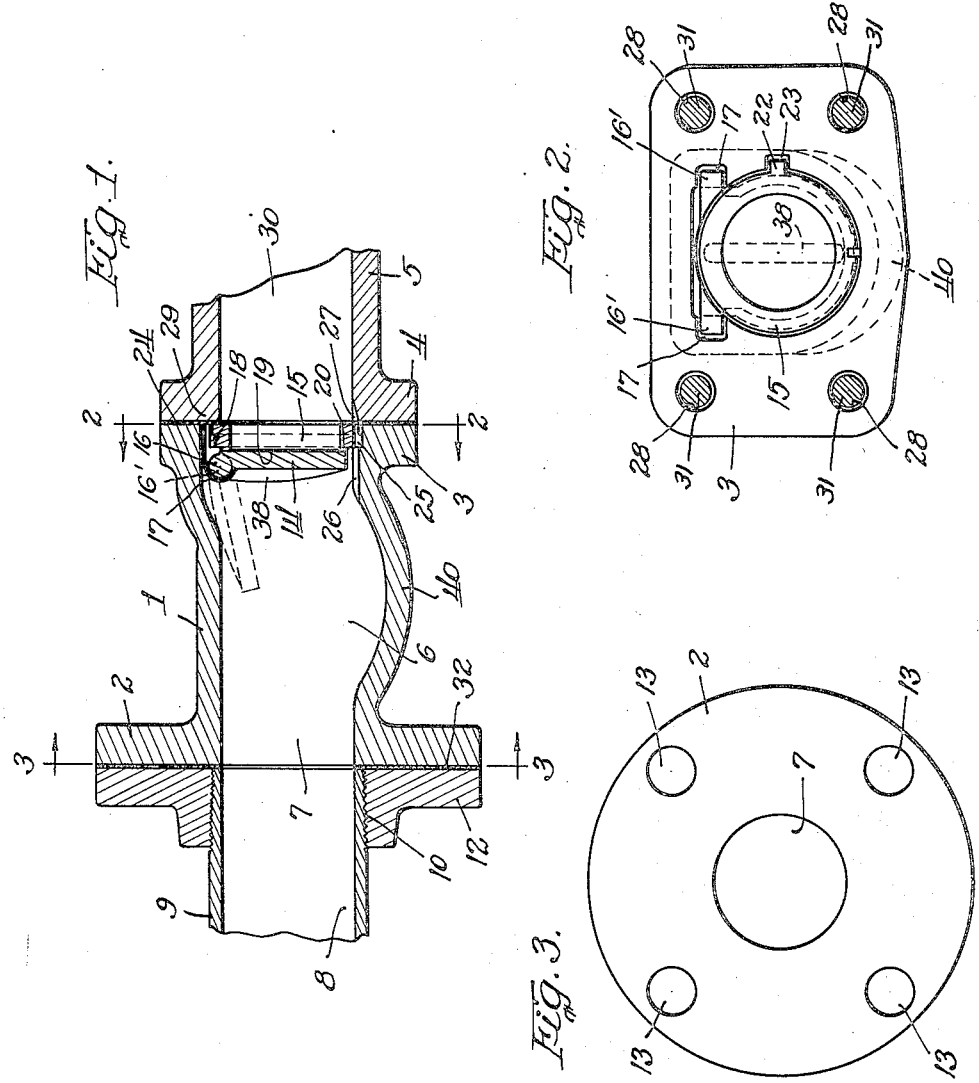
Inventor:
Harry E. La Bour.

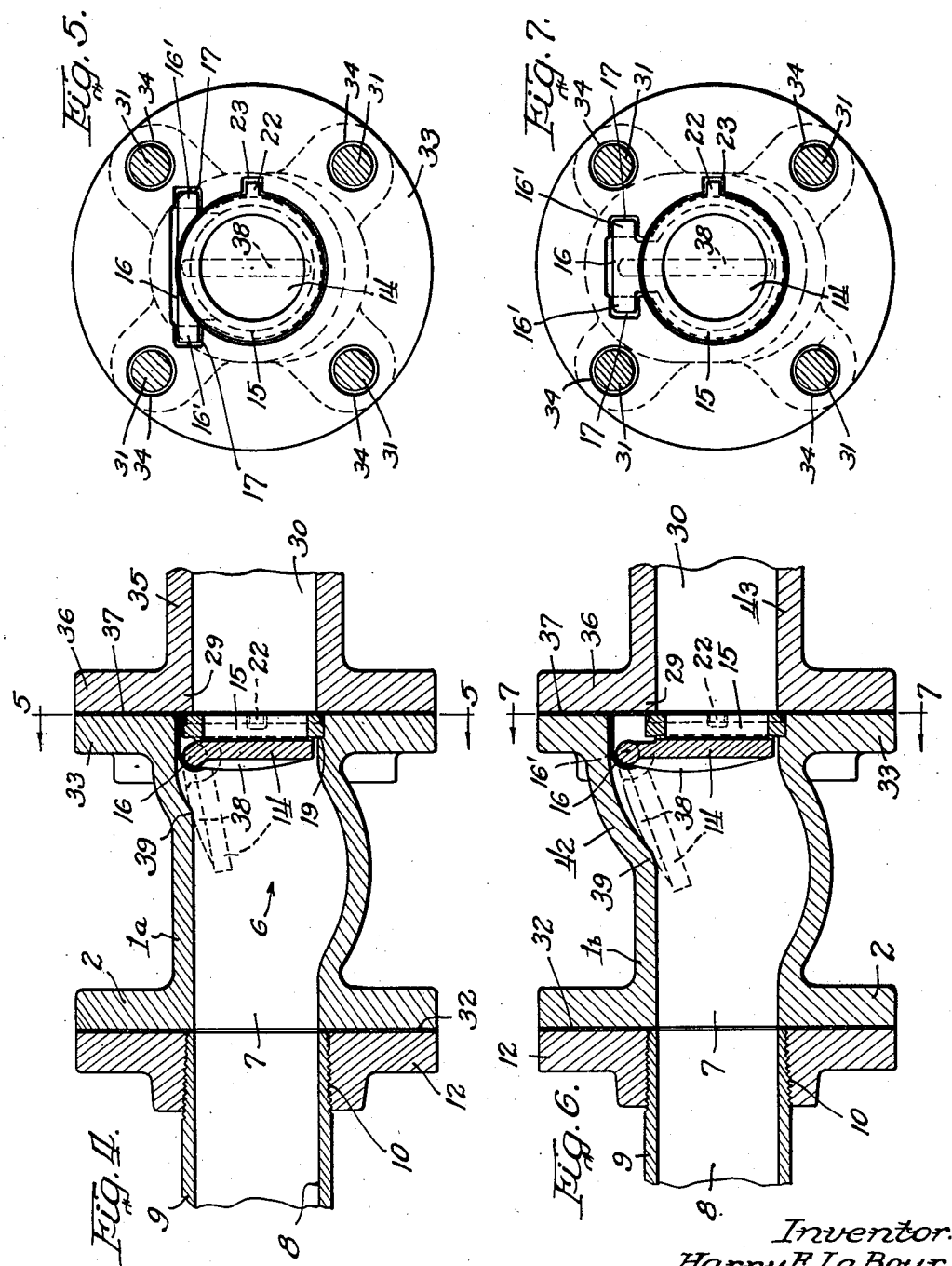

Patented Nov. 28, 1950

2,532,067

UNITED STATES PATENT OFFICE 2,532,067

AUTOMATIC RETURN FLOW CONTROL VALVE

Harry E. La Bour, Elkhart, Ind.

Application September 11, 1946, Serial No. 696,079

10 Claims. (Cl. 251—123)

The present invention relates to automatic valves for controlling the return flow of fluid in a conduit. Such a valve may be employed to shut off return flow completely or to restrict it to a limited value, as may be required by the particular circumstances.

In the operation of self-priming pumps of the liquid sealed gland type, such as the pump shown in my Patent No. 2,250,714, or of the type shown in my Patent No. 2,381,823, it is desirable to insert in the line of flow on the discharge side of the pump a so-called flow retarder, which limits the rate of return flow of liquid in the discharge pipe back into the pump when the pump is shut down. In pumps of that type where a liquid filled gap is employed to seal the shaft to the casing, the normal condition of pressure on the gap when the pump is operating is atmospheric pressure on the outside and sub-atmospheric pressure or suction on the inside, since the pump is self-priming and raises liquid from a lower source by suction. This type of self-priming pump does not require a valve in the intake. Hence, when the pump is shut down the liquid in the discharge pipe tends to flow back through the pump and pass down the auction pipe to the source. The pressure head of the liquid in the discharge pipe tends to put the pump casing under pressure so as to force liquid out through the gap between the shaft and the casing. This is undesirable.

As pointed out in said latter patent, it is desirable to put a flow retarder between the discharge pipe and the pump casing, so that the return flow of liquid from the discharge pipe into the pump will be at a rate low enough that the gap between the shaft and the casing will not be subjected to liquid under pressure, and hence no liquid will escape at this point.

Also, there may be situations where it is desirable to employ a check valve in the intake or discharge pipe of the pump or in any similar conduit. For this service, the present invention may be embodied as a check valve to shut off completely or substantially completely back flow of liquid in the conduit.

Pumps of this character are adapted for handling of corrosive liquids, and hence the parts of such a check or flow retarding valve should be rugged and should be so designed as not to be interfered with by corrosion. Parts of this section are undesirable. At the same time it is desirable that the valve be compact for ease and convenience in arranging and disposing the discharge connection of the pump or other conduit. Also the valve should be readily accessible for cleaning or for replacement of the parts if necessary.

While I shall describe herein as the preferred embodiment a flow retarder, that is, a check valve with a bypass, it is to be understood that the bypass may be omitted since the same structure which provides the flow retarder may, by omission of the bypass, become an automatic check valve or flap valve for limiting the backward flow of liquid in a conduit.

According to the present invention, I provide two conduit parts provided with mating ends adapted to be clamped together with a gasket between them. Together they constitute a valve housing. These ends are preferably flanged, and the gasket engaging surfaces at the mating ends are preferably planar surfaces. This of course is subject to modification in detail. The one conduit part has a pintle recess opening out to the end of the part, i. e., being open to the end of the bore or passageway sufficiently to permit the introduction of the valve body with an integral pintle into the bore or passageway which is suitably shaped to allow swinging of the valve body between open and closed position in said bore or passageway, the pintle being introducible into the pintle recess. The pintle of the valve is loosely seated in said recess. The same conduit part also has an annular recess or seat for an annular valve seat member. The function of the recess or seat is to receive and hold the valve seat member in a definite position. The valve seat member in turn holds the valve in such position that the pintle cannot escape from the pintle recess or get cocked sidewise in the same. This annular seat or recess also opens out upon the end of the bore or passageway, so that the seat member can be introduced through the open end of said conduit part.

The valve seat member and valve have suitable cooperating faces for mutual engagement to close off the opening through the valve seat member. The faces are preferably planar. They may be conical or spherical if desired. The annular valve seat member has a back face which forms in effect a continuation of the adjacent gasket engaging surface of the adjacent conduit part. The second conduit part has a gasket engaging face which overlies the gasket engaging face of the seat member and the gasket engaging face of the conduit part in which the valve seat is seated. When the two conduit parts are clamped together, as by flange bolts or other well known means, the gasket seals the second conduit member to the first conduit member and to the valve seat member, thereby effectually sealing the latter two to each other. By simply unclamping the two conduit parts and separating them, the gasket, the seat member and the valve may be removed and replaced. This provides a simple, effective check valve. By cutting a passageway through or around the seat member or through or around the valve, return liquid flow of limited value may be permitted. Preferably this opening is formed at the side opposite the pintle, i. e., the normal bottom position, so that any sediment or debris tending to build up at the bottom will tend to be cleared away by reversal of flow at this point. This opening also assures an open duct or port for the escape of air from the discharge side of the pump during the priming period.

Now in order to acquaint those skilled in the art with the manner of constructing and operating a device in accordance with my invention, I shall describe, in connection with the accompanying drawings, a specific embodiment of the same.

In the drawings:

Figure 1 is a longitudinal vertical section through a flow retarder of my invention;

Figure 2 is an end elevation of the fitting containing the valve, taken on the line 2, 2 of Figure 1;

Figure 3 is an end elevation from the left of Figure 1, on the line 3, 3 of Figure 1;

Figure 4 is a longitudinal vertical section through a check valve for standard flange fittings;

Figure 5 is an end elevation from the left end of Figure 4, taken on the line 5, 5 of Figure 4;

Figure 6 is a longitudinal vertical section of a modified form of check valve; and Figure 7 is an end view from the left of Figure 6, taken on the line 7, 7 of Figure 6.

The flow retarder shown in Figures 1 to 3 comprises a valve housing member 1, which is a tubular conduit member, with an integral clamping flange 2 at the left end as viewed in Figure 1, and an oblong clamping flange 3 at the opposite end which is formed to mate with the clamping flange 4 on the outlet or discharge nozzle 5 of a self-priming pump which may be of the type shown in my prior Patent No. 2,381,823. Obviously, the flanges 3 and 4 might be circular as is the flange 2 and the fitting 5 might be part of a liquid conducting conduit other than a pump if so desired. The passageway or bore 6, through the fitting or housing member 1, terminates on the left, as viewed in Figure 1 in an opening 7, which may be a standard pipe size adapted to make with the bore 8 of a wrought pipe 9 threaded at 10 into a companion clamping flange 12, having the clamping bolt holes 13, 13, as shown in elevation in Figure 3. The entry end of the passageway through the housing member 1 is adapted to accommodate the valve and valve seat members 14 and 15, respectively. The intermediate portion of the housing is suitably enlarged to permit free swinging of the flap valve 14 with adequate cross section of opening, so as not to form a serious restriction to flow of fluid therethrough. The flap or check valve 14 has an integral pintle 16 formed with cylindrical projections 16', 16' as viewed in Figure 2, upon which the valve 14 is hinged. This pintle is disposed in horizontal position at the top of the housing member 1, so that the valve 14 tends to close towards the seat member 15 by gravity. The pintle 16 is received in a suitable socket consisting of an enlargement of the inlet opening and the recesses 17, 17, which recesses open out upon the clamping face of the clamping flange 3.

The pintle 16 cannot escape from the pintle recess because the annular valve seat member 15 blocks its escape. At the same time the seat member 15 prevents any sidewise cocking of the pintle in the recess 17—17.

The annular valve seat member 15 has a shoulder 18 adapted to engage the bottom of an annular recess or seat forming a counterbore or its equivalent in the open end of the tubular housing 1. The recess has the shoulder 19 which may be a continuous circular shoulder or an interrupted one. It engages the shoulder 18 of the seat member 15. The function here is not to make a fluid tight seal between the shoulders 18 and 19, but merely to hold the valve seat member in definite position mechanically in the end of the bore and with its back face in position to be engaged fluid tight by a gasket 24. The seat member 15 preferably has an annular raised seat or bead 20 providing a flat face which is adapted to be engaged by the flat or planar face of the valve body 14. The seat member 15 may be provided with a projection 22 seated in a recess 23 to prevent turning of the seat member when the same is held in place in the recess 19. This generally is not necessary. Since the purpose of this specific arrangement is to reduce the back flow to a definite limited amount, a bypass is arranged around the valve seat. In the present construction, this takes the form of a groove 25 cut through the outer rim of the valve seat member 15, with suitable clearance at 26 and 27 in the adjacent parts 1 and 5. A gasket 24 is interposed between the flanges 3 and 4, and this gasket may be notched out, in register with the notch 25 in the periphery of the valve seat member 15, but throughout the rest of the periphery of the valve seat member 15 the gasket 24 overlies and engages in sealed relation the back face of the valve seat member 15, which it is to be observed is substantially in the plane of the clamping face of the flange 3. Thus, when the two flange parts 3 and 4 are brought together, and clamping bolts 31 through the bolt holes 28, 28 are drawn up to put sealing pressure on the gasket 24, the annular part or shoulder 29, which defines the bore 30 of the nozzle or conduit member 5 overlies the back face of the annular valve seat member 15, and puts gasket sealing pressure upon the portion of the gasket interposed between them. Thus the gasket 24 forms a seal between the flanges 3 and 4, and between the flange 4 and the valve seat member 15, whereby the valve seat is effectually sealed to the said flange member 3.

In operation, when the pump discharges liquid, fluid enters from the nozzle member 5, moving to the left of Figure 1, pushes the flap valve 14 into the dotted line position shown in Figure 1, and passes out through the discharge bore 7 and into the discharge pipe 8. Upon cessation of liquid pressure from the right, and assuming that there is a head of liquid in the discharge pipe 9, there will tend to be a counterflow of liquid towards the right. The valve 14, upon cessation of flow, tends to drop to the closed position, and the tendency for return flow, because of hydraulic head in the pipe 9, will force the valve 14 against its seat 20 effectively sealing the same. Return flow of liquid is, however, allowed through the passageway 25 formed in the cut around the valve seat member 15. Any tendency for sediment or solids to deposit by gravity at the bottom of the valve 14 is overcome by the return flow from the right when the pump is again started by discharge of liquid through the passageway 25 tending to remove the deposited solids.

It is obvious that if the complete cutting off of return flow is desired, the passageway 25 will be omitted and the gasket 24 will form a continuous seal around the entire periphery of the right hand end of the valve seat member 15.

The connection to the discharge flange 2 may be that of any suitable piece of equipment or conduit as desired. A gasket 32 is preferably introduced between the flanges 2 and 12, as is well understood by those skilled in the art.

In Figures 4 and 5 I have illustrated the valve of my invention as a check valve for standard pipe flange fittings. In this case, the body 1a is substantially like the body 1 shown in Figure 1. It is provided, however, with a flange of standard pipe flange dimensions at 33 having the bolt holes 34, 34 which, for the same pipe sizes, would match with the holes 13, 13 of the flange shown in Figure 3. In other words, the flanges 2 are of standard dimensions for a given size of pipe and the flanges 33 are, in general, likewise of standard dimensions for the same size of pipe. The inlet fitting 35 in Figure 4 may be like the discharge fitting 12, or it may consist of a tubular part having the integral flange 36 as shown. The flap valve 14 has the integral pintle 16 comprising the cylindrical projections 16', 16', seated in a socket consisting of the transverse opening and recesses 17, 17, which open out upon the clamping face of the flange 33. The valve 14 in both Figures 1 and 4 has a vertical flange or rib 38 upon the back of the same for reenforcing the valve and to serve as a bumper against the shoulder 39 formed in the top wall of the bore of the fitting. The bore is so formed as to give clearance to the valve in retreating into open position, and is bulged down as at 40 to provide sufficient cross sectional opening at the tip of the valve when the valve is in wide open position. The width of the bore normal to the plane of the paper in Figures 1 and 4 is great enough to allow for free swinging of the valve 14 into open position.

In Figure 4, the valve seat member 15 has a continuous annular body seated in the recess terminating in the shoulder at 19, and has its rear face lying in the plane of the clamping flange 33 so that the gasket 37, when pressed between the flange 36 on the right hand side and the flange 33 and the valve seat member 15 on the left hand side, forms a seal between all three of these parts, as previously explained in connection with Figure 1.

The valve seat member 15 may be held against rotation by projection 22 and notch 23 as previously described. It can be seen that in either Figure 1 or Figure 4 access to the valve and seat may be very simply had by unbolting the flanges and moving them laterally away from each other, whereupon the valve seat 15 and the valve 14 will be exposed, and can be withdrawn for inspection, repair or replacement.

While I have shown the valve face and valve seat as flat cooperating surfaces, it will be appreciated that the matching surfaces may be conical, spherical or any other suitable shape where a metal to metal contact is employed. The body of the housing may be made of corrosion resisting metal in which event the valve seat and valve body may similarly be made of like material, or they may even be made of porcelain or glass or plastic immune to chemical attack. The relatively loose fitting of the pintle in the socket which supports the same permits the valve to move to seat with fluid pressure without requiring close fit of any of the parts.

In the form of device shown in Figures 6 and 7, the pintle and sockets are disposed radially outside the valve seat member 15, whereby the length of the pintle 16, as shown in Figure 7, may be substantially reduced. This is accompanied by a greater bulge at the portion 42 of the wall of the conduit of the housing member 1b. This bulge 42 provides room for the valve 14 to rise well above the center line of the fitting and thus increase the cross sectional opening through the fitting at the tip of the valve 14.

In this construction also the gasket 37 overlies the clamping flange 33 in the back face of the seat member 15 so that when the clamping flange 36 of the companion fitting 43 is clamped against the opposite face of the gasket 37, this gasket will form a seal between the flanges 33 and 36 and between the valve seat member 15 and the adjacent shoulder 29 of the flange 36, whereby the valve seat member is sealed to the corresponding flange 33, or, in other words, made tight in the conduit member 1b as above explained.

It is to be observed that whereas the outlet end of the passageway through the housing member may be of standard pipe size, the opening at the inlet end is made substantially larger in order to provide a seat for the ringlike valve seat member 15, and the intermediate parts of the passageway are shaped so as to permit, first, that the swinging valve member 14 may swing open without undue restriction of the cross section of the passageway; and, second, that it may surround the seat for the pintle of the valve. The internal diameter of the valve seat member 15 is preferably made slightly less than the diameter of the outlet opening 7 which latter is a standard pipe dimension. This, of course, is optional, since the internal diameter of the ringlike element 15 might be the same as the standard pipe dimension of the adjacent conduit, or it might even be larger, so long as the seal is maintained between the portion 29 and the gasket which overlies it and seals it to the back face of the seat member 15.

The structure is such that a flow retarder or check valve may be made with very minor differences of structure. The parts are rugged and simple and so arranged that they may be readily made of corrosion resisting metal which is difficult to cast to accurate size. No close fits of the parts is demanded. The arrangement is such that corrosion does not interfere with operation, and will not bind the parts if it does occur.

I do not intend to be limited to the specific details as shown, except as they are made essential in the appended claims, since variations and modifications will occur to those skilled in the art.

I claim:

1. In a valve device, the combination of two tubular fittings having mating clamping flanges, a gasket clamped between the faces of said flanges, the first of said fittings having an annular recess opening out upon the gasket, an annular valve seat member disposed in said recess and being engaged by and sealed to said gasket, said first fitting having a pintle recess adjacent to and opening into the annular recess, and a flap valve cooperating with said valve seat member and having a pintle at one edge, said pintle being disposed in and journaled in said pintle recess and retained in alignment therein by said annular valve seat member.

2. For use in a fluid conduit, the sub-combination of a tubular body having an inlet end and an outlet end and being provided with connecting means at each end including a clamping flange at its inlet end, said body having an inlet end and an outlet end and a tubular passage therethrough which passage is enlarged in cross section adjacent its inlet end to accommodate a flap valve, there being a pintle recess at one side of the passage at the inlet end thereof, a flap valve having a pintle disposed in and journaled in said recess, and an annular valve seat member having a rear face and a front face with which latter face said flap valve cooperates, disposed in the open inlet end of said body the pintle recess holding the pintle against movement in the direction in which the valve body opens and the valve seat member limiting the motion of the valve and pintle in the direction in which the valve member closes, to retain the pintle in the recess, said body having supporting shoulders adapted to hold the valve seat member with its rear face substantially in the plane of the adjacent face of the clamping flange.

3. In a valve device, a first tubular member terminating in a clamping flange having a gasket engaging face, a second tubular member terminating in a clamping flange with a gasket engaging face and mating with said first member, an annular valve seat member seated in a recess in the bore of the first member with a gasket engaging clamping face substantially flush with the gasket engaging clamping face of the first member, a flap valve having an integral pintle set in and hinged in a recess in the first member adjacent the valve seat member, a gasket between the first and second member and between the valve seat member and said second tubular member, and means to clamp said clamping flanges and seat member upon said gasket.

4. In a device of the class described, a pair of complementary tubular parts having flat clamping faces, one of said parts having an annular recess for a valve seat member and a valve seat member disposed in said recess and having a flat clamping surface substantially flush with the clamping face of the part in which it is seated, and having a pintle recess adjacent said valve seat member, a flap valve body having an integral pintle disposed in and hinged in said recess, said valve body being adapted to cooperate with the seat member for restraining back flow, and means for clamping the faces of said tubular parts together.

5. For disposal between tubular fittings in a fluid conduit the subcombination of a tubular valve housing member having clamping flanges at each end adapted to fit cooperating clamping flanges of other conduit members of the same pipe size, the inlet end of said housing member having an outwardly opening socket for an annular valve seat member and having an outwardly opening recess for a valve pintle, a flap valve body having a pintle received in said recess, and an annular valve seat member seated in said socket said flap valve body being disposed in the tubular housing member inwardly of the valve seat member with the pintle in said recess, said valve seat member obstructing the removal of said valve body from said inlet end, and the engagement of the pintle in the recess limiting the movement of the valve body inwardly but allowing pivotal movement, said flap valve body being adapted to cooperate with said seat, said valve seat member having its outer end substantially flush with the face of the clamping flange.

6. The subcombination of claim 5 wherein the valve seat member and the socket have interfitting shoulders to prevent rotation of the valve seat member in the socket, and there being a bypass notch around the valve seat disposed opposite the location of the pintle.

7. For the construction of a device of the class described, a tubular fitting having a gasket clamping surface at one end, there being a pintle recess disposed at the side of the bore at said one end, and an annular socket for receiving a valve seat member disposed at said one end and opening out to the gasket clamping surface, the bore of said tubular fitting being enlarged in cross section to permit the hinging of a valve in said pintle recess without substantial restriction to flow by the valve, said pintle recess opening at its center into said annular socket.

8. In a device of the class described, a tubular body having a bore forming a passage therethrough and having an inlet end and an outlet end and having a planar clamping face at its inlet end disposed substantially at right angles to the longitudinal axis of the bore of said body, a ringlike valve seat member set into the bore at the inlet end of the tubular body, said valve seat member having a planar back face and a valve engaging front face surrounded by an annular shoulder, supporting shoulders in the bore for engaging said annular shoulder of the seat member and holding the back face of the latter in substantially the plane of the said clamping face of the tubular body there being a pintle recess in the upper part of the inlet end, said pintle recess having a central part opening radially into the bore and a flap valve with a pintle at its upper edge hinged in said pintle recess, said valve seat member preventing displacement of the pintle in said recess and confining it to hinging movement, the bore of said body adjacent said valve being locally enlarged to permit the valve to swing upwardly to open position and the adjacent bottom wall of the tubular body being bellied down whereby to maintain a substantially unrestricted passageway past the valve.

9. A valve for location in a run of conduit comprising a unitary tubular body having a clamping flange at one end disposed at substantially right angles to the longitudinal axis of the tubular body, said flange being adapted for cooperation with the flange on the adjacent end of a conduit section to be connected, there being an annular recess formed as an enlargement of the bore at the end of the body adjacent the flange for receiving a ringlike valve seat member, an annular ringlike valve seat member seated in said recess and adapted to be held in place when the flange on the body is clamped against the flange of an adjacent conduit section, said seat member having its outer face disposed substantially in the plane of the face of said clamping flange and having an annular valve seat facing inwardly, a hinge socket recessed in said body and extending inwardly from the annular recess to provide a hinge socket for a hinged flap valve, and a flap valve having an integral hinge pin disposed in said recess, said hinge pin being joined to said valve adjacent the upper margin of the valve, the annular valve seat member blocking the escape of the hinge pin from the hinge recess, said flap valve being adapted to be swung by gravity toward the annular valve seat.

10. In combination, a pair of flanged tubular fittings adapted to be clamped together on a plane at substantially right angles to the longitudinal axis of said fittings, the first of said fittings having a counterbore opening to the face of the flange of said fitting, and having also a pintle recess also opening toward said flange face and being disposed radially beyond the counterbore and communicating with said counterbore, a flap valve having a pintle disposed in said pintle recess and a ringlike valve seat member for cooperation with said valve disposed in the counterbore and held therein by said second fitting, said valve seat member blocking escape of the pintle out of said pintle recess.

HARRY E. LA BOUR.

REFERENCES CITED

The following references are of record in the file of this patent:

UNITED STATES PATENTS

| Number | Name | Date |
|---|---|---|
| 353,430 | Reynolds | Nov. 30, 1886 |
| 378,600 | Lenhart | Feb. 28, 1888 |
| 604,399 | Keenan | May 24, 1898 |
| 1,010,547 | Watrous | Dec. 5, 1911 |
| 1,236,596 | Nickol | Aug. 14, 1917 |
| 1,536,869 | Kizer | May 5, 1925 |
| 1,592,747 | Slagle | July 13, 1926 |
| 1,674,172 | Goerg | June 9, 1928 |
| 1,982,879 | Overbury | Dec. 4, 1934 |
| 2,356,815 | Bischoff | Aug. 29, 1944 |

Certificate of Correction

Patent No. 2,532,067                                              November 28, 1950

HARRY E. LA BOUR

It is hereby certified that error appears in the printed specification of the above numbered patent requiring correction as follows:

Column 7, lines 21 and 22, strike out the words "an inlet end and an outlet end and"; line 60, for "receess" read *recess*;

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*